Dec. 22, 1964 M. KRAVEN 3,162,000
METHOD OF SEALING TWO-PIECE GELATIN CAPSULES
Filed June 4, 1962

INVENTOR.
Max Kraven,
BY Richards & Cifelli,
Attorneys

United States Patent Office 3,162,000
Patented Dec. 22, 1964

3,162,000
METHOD OF SEALING TWO-PIECE
GELATIN CAPSULES
Max Kraven, Nutley, N.J., assignor to Cooper, Tinsley
Laboratories, Inc., Harrison, N.J., a corporation of
Delaware
Filed June 4, 1962, Ser. No. 199,676
1 Claim. (Cl. 53—37)

This invention relates in general to hard-shell gelatin capsules used in the marketing of material in comminuted solid form and has particular reference to the sealing of the capsule parts together to prevent accidental separation. Materials which may be employed in accordance with this invention includes pharmaceutical preparations, foods, cosmetics, or any other agents that may be encapsulated. Hereinafter, for the sake of brevity, the contents or charge of a capsule will be referred to as "the charge."

A conventional hard-shell gelatin capsule comprises a mated pair of tubular parts commonly known as the body and the cap. Both parts have one end closed and the other end open. The inside diameter of the cap is substantially equal to the outside diameter of the body to permit telescoping of the open end of the cap over the open end of the body with a pressed fit after the latter has been filled with its measured quantity of the charge.

There is always the possibility that some caps will not fit the associated bodies with sufficient snugness to insure against accidental separation. Such separation of parts either during the joining processing or after the capsules have been sold is embarrassing and uneconomical. Just a few rejects in a shipment of capsuled drugs is enough to damage the reputation of the pharmaceutical manufacturer. In consequence of the likelihood of accidental separation of improperly fitting capsule parts, the practice of sealing capsule bodies and their caps has resulted. The most common method of sealing has been to cement a circumferential band to the body and cap of each capsule at the area of juncture, but this banding method is expensive.

It, therefore, is the primary object of my present invention to provide an improved sealing method which avoids resort to banding.

To be more explicit, I accomplish the sealing of capsule parts in a highly satisfactory manner by applying a very small amount of water to meeting surfaces of both parts. Actually, I moisten the inner surface of each cap part before assembly with the mated body parts. Thereafter, when the cap part is pressed over the open end of the body part (with the charge contained therein), the united parts will be caused to adhere tenaciously together. Apparently, the water softens the gelatin enough to effect an adequate seal.

I am aware of prior art disclosures in accordance with which a liquid sealing medium is described as being applied to the contiguous side wall surfaces of the telescopically united component parts of a tubular gelatin capsule. In one instance, a sealing medium composed of a mixture of numerous chemicals in a liquid state is introduced to the inter-wall space between capsule parts by capillary attraction upon dipping of the assembled charge-filled capsule in a bath of the sealing medium. In another instance, a jet of the selected liquid sealing medium, which might be a gelatin solvent or a liquid adhesive, is directed against the exposed edge of the joint between telescopic parts of an assembled charge-filled capsule. Both of these exemplary prior art sealing methods are substantially identical, because both involve introduction of the liquid sealing medium to the meeting side wall surfaces of the mated capsule parts through capillary attraction. Obviously, the spacing between contiguous side walls of the capsule parts must be of capillary dimensions or capillary attraction will not occur. Therefore, complete reliance upon capillary attraction is likely to result in failure of proper application of the liquid sealing medium in some instances.

In view of the unreliability of capillary attraction as means to apply the liquid sealing medium to the assembled telescopic parts of a gelatin capsule, it is an auxiliary object of my invention to apply the sealing medium directly to the desired region of the inner surface of one part of the capsule before assembly with the other part. In this way, there can be no failure of sealing action.

The above stated and other objects will become apparent from a reading of the following description of an illustrative embodiment of this invention in connection with the accompanying drawings thereof, in which drawings.

Like characters of reference are applied in the above described views of the capsule sealing means of this invention to indicate corresponding parts thereof.

Figure 1:
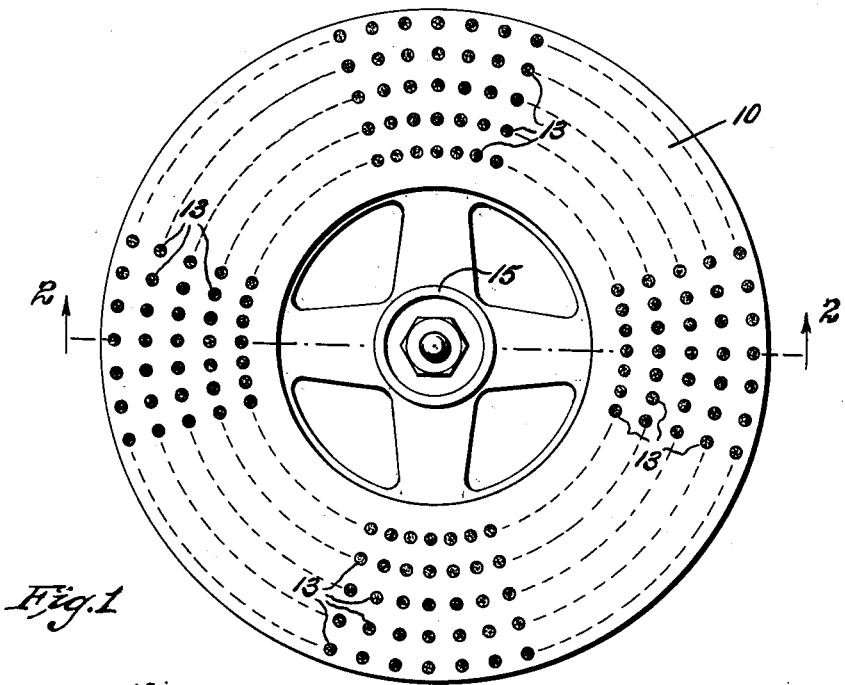
FIG. 1 is a plan view of the special peg ring employed for application of moisture to the inner surfaces of the capsule caps of the complete load carried by the standard cap ring of a capsule filling machine.

Before describing my improved capsule sealing method and the special peg ring which I have devised for performing that method in connection with a typical capsule filling machine, reference will first be made to those conventional old elements of such a machine which I intend to utilize but have not shown in the drawings.

A typical capsule filling machine includes a body ring having a great number of axial open-ended sockets to hold the body parts of capsules to be filled with a desired charge in comminuted form, such as granules or powder. The sockets for the capsule body parts are usually arranged in straight radial rows. A cooperative cap ring having cap-receiving open-ended sockets corresponding in number and arrangement to the sockets of the body ring is adapted to be positioned with its sockets in axial registration with the sockets of the body ring, after which a conventional peg ring with correspondingly arranged axial pegs forces the capsule caps into assembled position in telescopic enclosing relation to the capsule bodies.

In accordance with my improved sealing method, the empty capsule caps are loaded in the sockets of the cap ring and a very small quantity of water is applied to an inner surface area, preferably located on a side wall, of each cap part prior to assembly of the mated cap and body parts. The final step in my method is to assemble the charge-filled capsule body parts with the cap parts.

The accompanying drawings show the special peg ring 10 which is momentarily substituted for the conventional peg ring of the typical capsule filling machine. This special peg ring 10 has axial peg 11 projecting from its end face and is adapted to be removably attached to the rotatably and axially slidable adjustable shaft 12 provided in the capsule filling machine to mount the conventional capsule closing peg ring. The pegs 11 of special peg ring 10 correspond in number and arrangement to the cap holding sockets of the conventional cap ring C. Each peg 11 is shown to be substantially equal in diameter to one-half the diameter of each capsule cap part to be processed in the capsule filling machine and is provided with a moisture-retaining applicator tip portion 13, which preferably is in the form of an annular band of porous sponge rubber, or other suitable material.

To prevent the moisture-applying peg ring 10 from pushing the capsule cap parts 14 out of the top of the cap ring, a vertically extending thrust-limiting stop member 15 is secured to special peg ring 10 for contact with the underneath face of the conventional cap ring.

Figure 2:
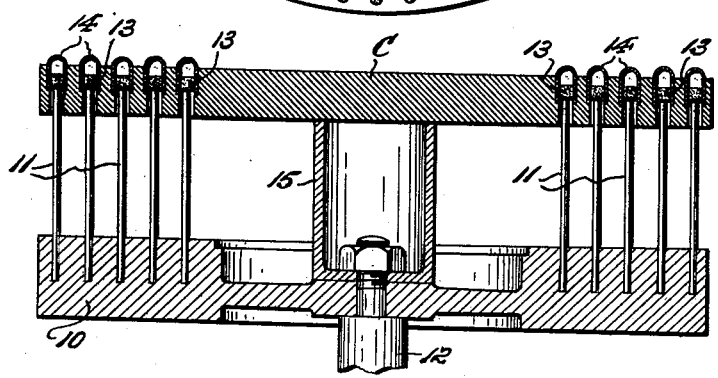
FIG. 2 is an axial sectional view of the special peg ring taken on line 2—2 in FIG. 1, showing the cap ring applied thereto.
Figure 3:
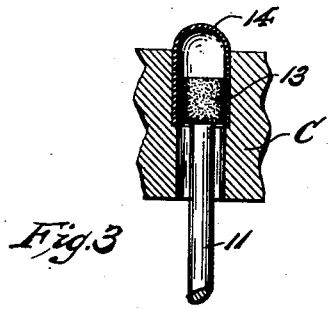
FIG. 3 is an enlarged fragmentary sectional view of the loaded cap ring, showing one peg of the special peg ring engaged within the cap of a gelatin capsule carried by the cap ring and with the liquid-retaining applicator tip in contact with a side wall of the cap.

In carrying out my method, the moisture-retaining tip portions 13 of all the pegs 11 on special peg ring 10 are moistened simultaneously with water or other suitable liquid medium. This may be done by dipping the pegs 11 in a water bath, or by rubbing the tips 13 with a wet brush or sponge. Then, the special peg ring 10 is properly aligned with the conventional cap ring C of the capsule filling machine and is moved axially toward said cap ring until the applicator tip portions 13 of pegs 11 enter the respective registering capsule cap parts 14 (FIGS. 2 and 3). Each applicator tip portion 13 may be pressed against the side wall of cap part 14 by imparting rotary motion to special peg ring 10. This action causes a modicum of water to be squeezed out of tip portion 13 and applied to the cap side wall. The final steps of my method are to retract special moisture-applying peg ring 10 into its inoperative position on the right side of the capsule filling machine; to move the original peg ring of the machine from inoperative position on the left side of the latter into operative position in axial registration with the cap ring; and then to use the said original peg ring to force the capsule body parts, after being filled with the charge, from the body ring into assembled relation to the cap parts. When this is done, the cap parts 14 will be effectively sealed in position covering the body parts, which is believed to be due to softening of the gelatin capsule parts in the moistened area sufficiently to aid in the sealing action. However, I do not desire to be bound to any particular theory for this proven sealing action.

While the invention has been illustrated and described with respect to a single embodiment thereof, it will be understood that it is intended to cover all changes and modifications of the embodiment shown which do not constitute departures from the spirit of the invention and scope of the appended claim.

Having now described my invention, I claim:

A method for filling and sealing hard gelatin capsules formed from mated body and cap parts, each of which parts has one closed end and one open end, and wherein the open end of each cap part is telescoped over the open end of the mated body part, which method comprises, disposing a plurality of said body parts in sockets therefor in a body ring with their open ends upward, filling each of said body parts with a charge of material to be encapsulated, disposing a plurality of said cap parts in sockets therefor in a cap ring with the open ends thereof downward, the number and arrangement of the sockets in said cap ring corresponding to the number and arrangement of the sockets in said body ring, applying a liquid medium to the inner surface of each of said cap parts by axially inserting therein a peg-like applicator having a liquid-retaining tip portion, causing said tip portion in a moistened condition to move laterally within the cap to contact the inner surface of said cap part, removing said peg-like applicators from said cap parts, moving said cap ring to a position above said body ring whereby each of said cap parts is axially aligned in registration with a corresponding charged body part, and forcing each of said capsule body parts into assembled relation with its corresponding cap part, whereby reliable application of said liquid medium to the inner surfaces of said cap parts and adequate sealing of said capsules is assured.

References Cited in the file of this patent
UNITED STATES PATENTS

| | | |
|---|---|---|
| 1,989,880 | Peffer | Feb. 5, 1935 |
| 2,575,007 | Deland | Nov. 13, 1951 |
| 2,747,543 | Navikas | May 29, 1956 |
| 3,025,652 | Sandhage et al. | Mar. 20, 1962 |
| 3,078,629 | Besemer et al. | Feb. 26, 1963 |